(12) United States Patent
Yu et al.

(10) Patent No.: US 7,301,594 B2
(45) Date of Patent: Nov. 27, 2007

(54) OPTICAL COMPENSATOR FOR A LIQUID CRYSTAL DISPLAY

(75) Inventors: Tsai-An Yu, Hsin Chu Hsien (TW);
Pi-Sung Lin, Taipei Hsien (TW);
Chih-Jen Chen, Taipei Hsien (TW);
Chiu-Fang Huang, Taipei Hsien (TW);
Wen-Yi Lin, Yuan Hsien (TW)

(73) Assignee: Far Eastern Textile Ltd., Taipei (TW)

( * ) Notice: Subject to any disclaimer, the term of this patent is extended or adjusted under 35 U.S.C. 154(b) by 492 days.

(21) Appl. No.: 11/043,308

(22) Filed: Jan. 27, 2005

(65) Prior Publication Data
US 2006/0055854 A1  Mar. 16, 2006

(30) Foreign Application Priority Data
Sep. 15, 2004  (TW) .............................. 93127886 A
Dec. 3, 2004  (TW) .............................. 93137402 A

(51) Int. Cl.
*G02F 1/1335* (2006.01)
(52) U.S. Cl. ......................................... 349/120; 428/1.1
(58) Field of Classification Search ................ 349/117, 349/120; 428/1.1, 1.3, 64.1, 395
See application file for complete search history.

(56) References Cited

U.S. PATENT DOCUMENTS

| | | | |
|---|---|---|---|
| 5,504,603 A | | 4/1996 | Winker et al. |
| 5,619,352 A | | 4/1997 | Koch et al. |
| 5,907,378 A | * | 5/1999 | Abileah et al. ............. 349/123 |
| 6,881,453 B2 | * | 4/2005 | Kido et al. .................. 428/1.1 |
| 6,905,640 B2 | * | 6/2005 | Tanaka ....................... 264/1.34 |
| 2001/0040652 A1 | * | 11/2001 | Hayashi ....................... 349/96 |
| 2002/0041352 A1 | * | 4/2002 | Kuzuhara et al. ........... 349/117 |
| 2002/0045015 A1 | | 4/2002 | Ito |

FOREIGN PATENT DOCUMENTS

WO    WO 01/20394 A1    3/2001

* cited by examiner

*Primary Examiner*—Toan Ton
(74) *Attorney, Agent, or Firm*—Pillsbury Winthrop Shaw Pittman, LLP

(57) ABSTRACT

An optical compensator includes a C-plate adapted to be coupled to a liquid crystal cell and made from a polymer. The C-plate has a layer thickness ranging from 5 to 60 μm. The polymer is polyvinyl alcohol, has a polymerization degree greater than 2000 and less than 5000, and is cross-linked so that the C-plate has an optical axis substantially parallel to the direction of normally incident light, and so that the C-plate has a plate retardation, along the layer thickness of the C-plate, greater than 60 nm.

34 Claims, 13 Drawing Sheets

OPTICAL COMPENSATOR FOR A LIQUID CRYSTAL DISPLAY

CROSS-REFERENCE TO RELATED APPLICATION

This application claims priority of Taiwanese Patent Application No. 093127886, filed on September 15, and No. 093137402, filed on Dec. 3, 2004.

BACKGROUND OF THE INVENTION

1. Field of the Invention

This invention relates to an optical compensator for a liquid crystal display, more particular to an optical compensator including a negative uniaxial birefringent plate that has a thickness ranging from 5 μm to 60 mμ and that is made from cross-linked polyvinyl alcohol having a polymerization degree greater than 2000.

2. Description of the Related Art

Optical compensators are known in the art for correcting retardation in a liquid crystal cell or a polarizer of a liquid crystal display. The following are some examples of compensators commonly used in liquid crystal displays. A C-plate is a uniaxial birefringent plate having an extraordinary axis or optical axis perpendicular to the surface of the plate or parallel to the direction of a normally incident light, and is useful for eliminating light leakage of the liquid crystal cell. An C-plate is a uniaxial birefringent plate having an extraordinary axis parallel to the surface of the plate, and is useful for eliminating light leakage of the polarizer. An O-plate can be either a uniaxial birefringent plate or a biaxial birefringent plate with a principle optical axis oriented at an oblique angle relative to the surface of the plate, and is useful for eliminating light leakage of the liquid crystal cell. A compensator may also include a combination of the C-plate, the A-plate, and/or the O-plate, which is useful for eliminating light leakage of the liquid crystal cell and the polarizer.

When a full voltage is applied to the liquid crystal cell, the molecules of the liquid crystal cell experience continuous variation in molecular orientation, which can separate the cell into three regions, i.e., a central region and two opposite end regions, each of which is characterized by its own optical symmetry. The central region of the cell can be considered as nominally homeoptropic in the full voltage state, and exhibits a property similar to a positive C-plate, which can introduce a phase retardation that leads to a loss in contrast. As such, a negative C-plate can be used as a compensator to correct the retardation of the central region of the cell. The end regions of the liquid crystal cell exhibit an A-plate-like property with opposite signs, i.e., one of which exhibits a positive birefringence whereas the other exhibits a negative birefringence. The end regions of the liquid crystal cell cancel each other in the effect of the phase retardation.

U.S. Pat. No. 5,619,352 discloses an optical compensator for a liquid crystal display. The compensator includes an O-plate made from an organic liquid crystal polymer thin film that is uniaxial or near uniaxial in character and that has a splayed and/or twisted structure which imparts the O-plate with a property similar to one having a biaxial optical symmetry. The compensator thus formed improves contrast and grayscale stability of the liquid crystal display. The compensator can further include one or more A-plates and/or C-plates for obtaining the desired retardation value.

As disclosed in U.S. Pat. Nos. 5,504,603 and 5,619,352, and WO 01/20394 A1, an A-plate can be fabricated by the use of uniaxial stretched polymer films, such as polyvinyl alcohol, polycarbonate, or other suitably oriented organic birefringent materials, or a positive birefringent liquid crystal or mesogenic material with a planar orientation, and a C-plate can be fabricated by the use of uniaxial compressed polymers, stretched polymer films, or by the use of physical vapor deposited inorganic thin films, or a liquid crystal or mesogenic material with a planar orientation and a negative birefringence.

The compensator is laminated with the polarizer to form a polarization plate which is subsequently cut into a desired size corresponding to the liquid crystal cell, and is then attached to the liquid crystal cell. The liquid crystal cell and the polarization plate can be assembled together in one of two modes, i.e., O-mode and E-mode. In the O-mode, the absorbing axis of the polarizer is designed to be parallel to the orienting direction of an orienting layer of the liquid crystal cell, whereas in the E-mode, the absorbing axis of the polarizer is designed to be perpendicular to the orienting direction of an orienting layer of the liquid crystal cell.

As disclosed in WO 01/20394 A1, when the liquid crystal cell and the polarization plate are to be assembled together in the O-mode manner, the use of an optical compensator including an O-plate and an A-plate for a liquid crystal display results in severe drawbacks during mass production. Since an A-plate having an optic axis oriented perpendicular to its longitudinal direction or moving direction is difficult to achieve, orientation of the optical axis of the A-plate is normally parallel to the longitudinal direction. As a consequence, the A-plate cannot be laminated with the polarizer of the liquid crystal display or with the O-plate in a roll-to-roll manner due to cross relation between the optical axis of the A-plate and the absorbing axis of the polarizer or between the optical axis of the A-plate and the principle optical axis of the O-plate.

As further disclosed in WO 01/20394 A1, a twisted A-plate is provided such that when the liquid crystal cell and the polarization plate are to be assembled together in the E-mode manner, the twisted A-plate can be laminated with an O-plate or a polarizer in a roll-to-roll manner so as to form a desired compensator, thereby permitting mass production of the liquid crystal display. However, the horizontal and vertical viewing angles of the display compensated by the compensator are still too narrow.

A C-plate is normally included in the compensator so as to improve compensation effect on the liquid crystal cell when the E-mode is used. However, a C-plate is difficult to be prepared due to the orientation of its optical axis, which is perpendicular to the plate surface. As such, there is a need to provide a C-plate that is relatively easy to manufacture.

U.S. Patent Application Publication No. 2002/0045015 discloses an orienting layer made from a polymer mixture that includes two polymers, such as denatured polyvinyl alcohol and polyvinyl alcohol, having different polymerization degrees. One of the polymers (lower polymer) has a polymerization degree ranging from 100 to 500, while the other (high polymer) has a polymerization degree ranging from 750 to 2000. The orienting layer preferably has a layer thickness ranging from 0.7 to 2 μm, and more preferably has a layer thickness ranging from 0.85 to 1.25 μm so as to achieve a very smooth surface and so as to provide an orienting function for aligning liquid crystal molecules of a liquid crystal compensator by coating on the liquid crystal compensator. Since the orienting layer solely is used for aligning the liquid crystal molecules of the liquid crystal compensator, the retardation thereof should be as small as possible so as not to provide any compensation effect on the liquid crystal cell.

The entire disclosures of the aforesaid U.S. Pat. Nos. 5,619,352 and 5,504,603, and WO 01/20394 A1 are incorporated herein by reference.

SUMMARY OF THE INVENTION

Therefore, the object of this invention is to provide an optical compensator including a C-plate that is capable of overcoming the aforesaid drawbacks of the prior art.

According to one aspect of the present invention, an optical compensator is provided for correcting a cell retardation in a liquid crystal cell. The compensator comprises a C-plate adapted to be coupled to the liquid crystal cell, and made from a polymer. The C-plate has a layer thickness ranging from 5 to 60 µm. The polymer is polyvinyl alcohol, has a polymerization degree greater than 2000 and less than 5000, and is cross-linked so that the C-plate has an optical axis that is substantially parallel to the direction of normally incident light, and so that the C-plate has a plate retardation, along the layer thickness of the C-plate, greater than 60 nm.

According to another aspect of the present invention, there is provided a liquid crystal display that comprises: a polarizer layer; an analyzer layer; a liquid crystal cell disposed between the polarizer layer and the analyzer layer; and an optical compensator. The compensator includes a negative C-plate disposed between the liquid crystal cell and one of the polarizer layer and the analyzer layer, and made from cross-linked polyvinyl alcohol that has a polymerization degree greater than 2000 and less than 5000.

According to yet another aspect of the present invention, an optical compensating method for correcting a cell retardation of a liquid crystal cell is provided. The method comprises: preparing an optical compensator including a negative C-plate that is made from polyvinyl alcohol which has a polymerization degree greater than 2000 and less than 5000 and which is cross-linked; preparing a liquid crystal cell having a surface that is perpendicular to normally incident light; and attaching the optical compensator to the surface of the liquid crystal cell in such a manner to enable correction of the cell retardation of the liquid crystal cell.

BRIEF DESCRIPTION OF THE DRAWINGS

Other features and advantages of the present invention will become apparent in the following detailed description of the preferred embodiment of the invention, with reference to the accompanying drawings. In the drawings.

DETAILED DESCRIPTION OF THE PREFERRED EMBODIMENT

Figure 1:
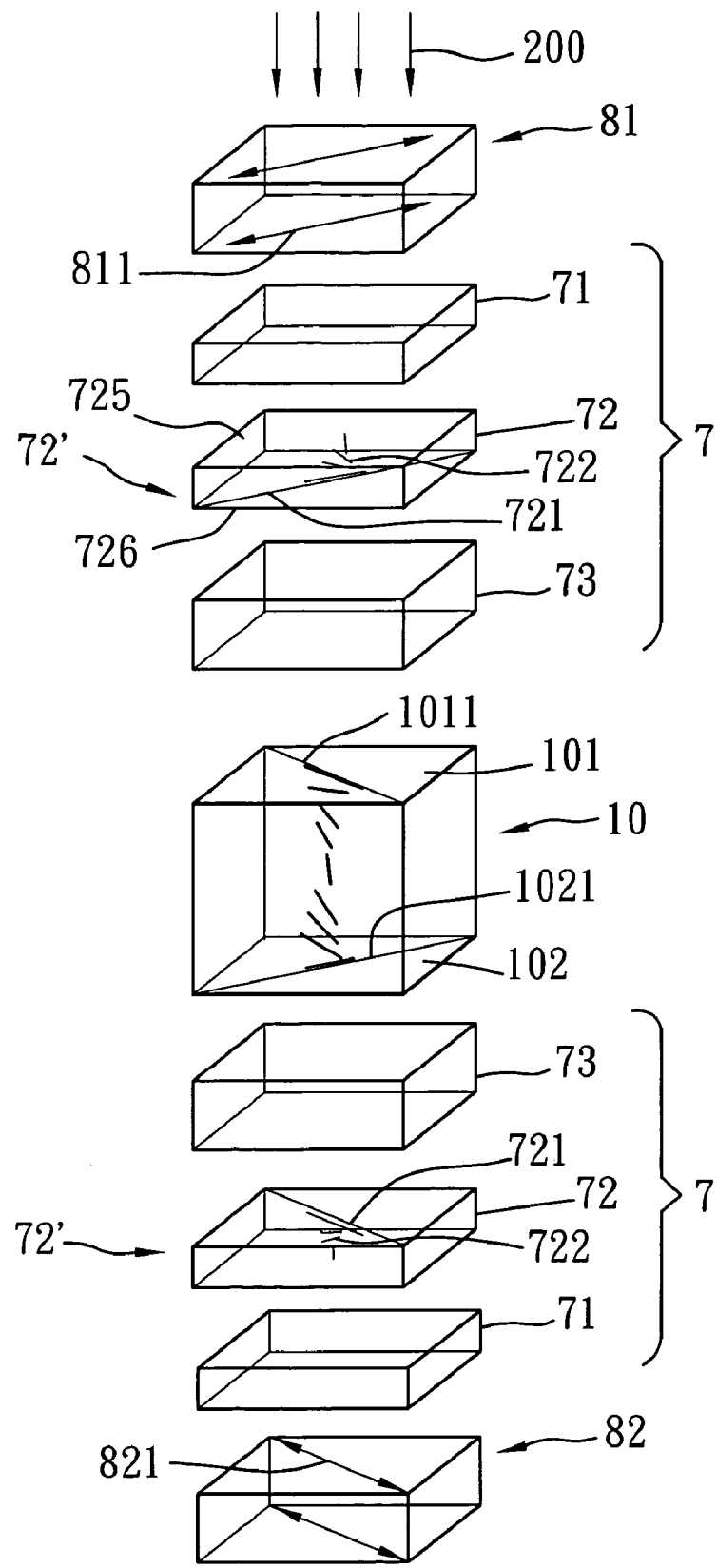
FIG. 1 is an exploded schematic view of the preferred embodiment of a liquid crystal display according to this invention.

FIG. 1 illustrates the preferred embodiment of a liquid crystal display according to this invention.

The liquid crystal display includes: a polarizer layer 81; an analyzer layer 82; a liquid crystal cell 10 disposed between the polarizer layer 81 and the analyzer layer 82; and a pair of optical compensators 7, each of which is disposed between the liquid crystal cell 10 and an adjacent one of the polarizer layer 81 and the analyzer layer 82. Each compensator 7 is incorporated with a respective one of the polarizer layer 81 and the analyzer layer 82 to form a polarization plate, and includes a transparent substrate 71, a positive birefringent O-plate 72', and a negative C-plate 73, which are disposed between the liquid crystal cell 10 and an adjacent one of the polarizer layer 81 and the analyzer layer 82 for correcting cell retardation of the liquid crystal cell 10. The O-plate 72' is laminated with and is sandwiched between the C-plate 73 and the substrate 71. Optionally, the compensator 7 may further includes an A-plate (not shown) for achieving a desired compensation on the polarization plate.

In this embodiment, the liquid crystal cell 10 used is a twisted nematic (TN) type cell, and the liquid crystal display thus formed is a TN-LCD.

The transparent substrate 71 is preferably made from an isotropic material selected from the group consisting of glass, cellulose esters, polycarbonate, polysulfone, polycycloolefin, polyether sulfone, polyacrylate, and polymethacrylate. The isotropic material exhibits a property such that the velocity of light is the same in all directions.

Figure 3:
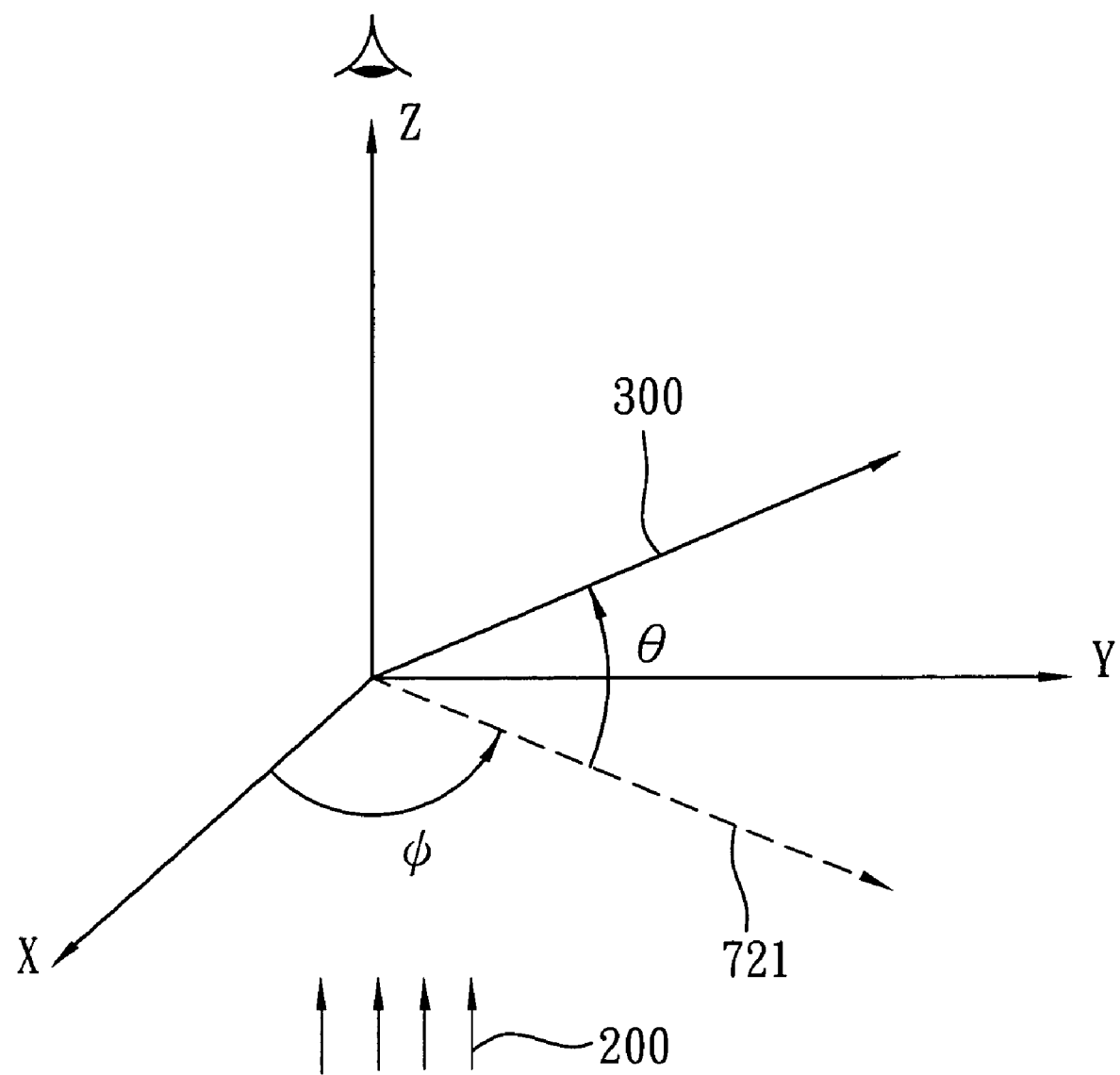
FIG. 3 is a coordinate system illustrating the orientation of the molecules of an O-plate of the preferred embodiment.

The O-plate 72' includes a liquid crystal layer 72 with a splayed structure. The liquid crystal layer 72 has a first surface 725 in contact with the substrate 71, and a second surface 726 opposite to the first surface 725 and in contact with the C-plate 73. The orientation directions 300 (see FIG. 3) of the molecules 722 (see FIG. 1) of the liquid crystal layer 72 are tilted monotonously with respect to a plane (i.e., the x-y plane shown in FIG. 3) parallel to the first and second surfaces 725, 726 at a tilt angle (indicated as θ in FIG. 3) that varies from a minimum value at the second surface 726 of the liquid crystal layer 72 to a maximum value at the first surface 725 of the liquid crystal layer 72. In this embodiment, the tilt angle θ of the molecules 722 of the liquid crystal layer 72 is about 90 degrees at the first surface 725 of the liquid crystal layer 72 and is about 0 degree at the second surface 726 of the liquid crystal layer 72. Preferably, the O-plate 72' has a layer thickness ranging from 0.5 to 5 µm. In this embodiment, the molecules 722 of the liquid crystal layer 72 are reactive rod-like liquid crystal molecules.

Each of the polarizer layer 81 and the analyzer layer 82 has an absorbing axis 811, 821. The absorbing axis 811 of the polarizer layer 81 is perpendicular to the absorbing axis 821 of the analyzer layer 82. The liquid crystal cell 10 includes opposite first and second orienting layers 101, 102, each of which is disposed adjacent to a respective one of the polarizer layer 81 and the analyzer layer 82 and each of which has a molecular orienting direction 1011, 1021. In this embodiment, the liquid crystal cell 10 and the polarization plate are assembled together in the E-mode manner, i.e., the projection 721 (see FIG. 3) of the orientation directions 300 of the molecules 722 of the liquid crystal layer 72 of each of the compensators 7 on the plane is parallel to the absorbing axis 811 (821) of an adjacent one of the polarizer layer 81 and the analyzer layer 82, and the molecular orienting direction 1011, 1021 of each of the first and second orienting layers 101, 102 is perpendicular to the absorbing axis 811, 821 of the respective one of the polarizer layer 81 and the analyzer layer 82. The projection of the molecules 722 of the liquid crystal layer 72 is oriented at a twisted angle φ with respect to the x-axis. In this embodiment, the twisted angle φ is about 45 degrees. The absorbing axis 811 of the polarizer layer 81 is thus oriented at about 45 degrees with respect to the x-axis.

Figure 2:
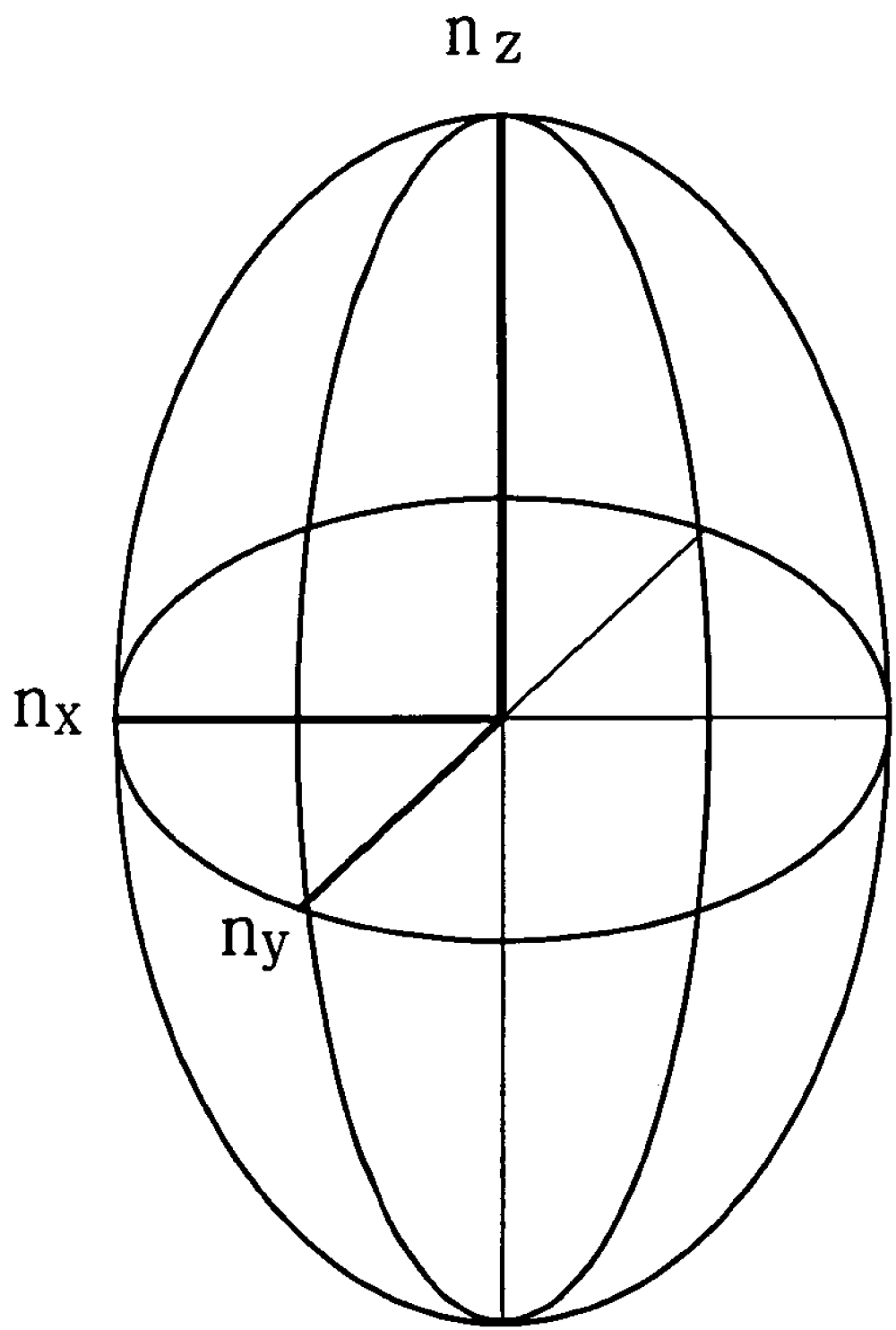
FIG. 2 is an optical indicatrix for a uniaxial birefringent material of a C-plate of the preferred embodiment.

The C-plate 73 is made from a polymer that is polyvinyl alcohol (PVA) in this embodiment and that has a polymerization degree greater than 2000 and less than 5000 and that is cross-linked so that the C-plate 73 has an optical axis substantially parallel to the direction of normally incident light 200 (see FIG. 1). Preferably, the C-plate 73 has a polymerization degree greater than 2600 and less than 4000, a layer thickness ranging from 5 to 60 µm, and a plate retardation $R_{th}$, along the layer thickness of the C-plate 73, greater than 60 nm, and preferably greater than 140 nm. The retardation $R_{th}$ is defined by the following formulas, $$R_{th} = (\Delta n)d$$

$$\Delta n = (n_x + n_y)/2 - n_z$$

wherein $n_x$, $n_y$, and $n_z$ are respectively refractive indexes in the x, y, and z directions (see FIG. 2). In this embodiment, the C-plate is negative, i.e., $n_x$ and $n_y$, are greater than $n_z$.

When the polymerization degree of the PVA polymer is less than 2000, the retardation of the C-plate 73 is inadequate to provide the function of an optical compensator. In addition, insufficient cross-linking of the PVA polymer also leads to a small retardation value. The PVA polymer preferably has a saponification degree greater than 95 mol %, and more preferably has a saponification degree greater than 98 mol %.

The PVA polymer is cross-linked through a cross-linking agent that is preferably selected from the group consisting of melamine formaldehyde, hexamethylmelamine, hexamethoxymethylmelamine, $C_2$-$C_6$ dialdehydes, and a combination thereof. Preferably, the cross-linking agent has a weight percentage, based on the weight of the PVA polymer, ranging from 5 wt % to 40 wt %.

The C-plate 73 may include a supporting substrate (not shown) that is made from an isotropic material selected from the group consisting of glass, cellulose esters, polycarbonate, polysulfone, polycycloolefin, polyether sulfone, polyacrylate, and polymethacrylate. The supporting substrate preferably has a transparency greater than 80%, a planar retardation ($R_e$) less than 20 nm, and a ratio of $R_e400/R_e700$ less than 1.2, and more preferably has a planar retardation less than 10 nm.

In order to facilitate the formation of the C-plate 73, a removable supporting substrate can be used for coating of a solution containing the PVA polymer thereon. The removable supporting substrate can be made from a material selected from the group consisting of glass, cellulose acetate, polyethylene terephthalate (PET), polycarbonate, and polyethylene naphthalate, and preferably has a layer thickness ranging from 20 to 200 µm, and more preferably ranging from 40 to 200 µm. Moreover, a protective film, such as polyethylene film and polypropylene film, can be attached to the C-plate 73 to protect the C-plate 73 from damage.

Formation of the C-plate 73 can be carried out by a method including the steps of: preparing a solution that contains PVA, which has a polymerization degree greater than 2000 and less than 5000, a cross-linking agent, and a solvent, and that has a pH less than 4.5; coating the solution on a supporting substrate; and heating the coated film on the supporting substrate to a predetermined temperature to permit complete cross-linking of the PVA so as to form the coated film into the C-plate 73. The solvent used in the aforesaid method is preferably water or a mixture of water and methanol. When the mixture of water and methanol is used as the solvent, the ratio of methanol to water preferably ranges from 1:5 to 1:2. A weak acid is added into the solution so as to adjust the pH of the solution to the desired value to permit initiation of the cross-linking reaction. The weak acid is preferably p-toluenesulfonic acid or acetic acid. The aforesaid predetermined temperature preferably ranges from 90 to 150° C., and more preferably ranges from 110 to 130° C.

The C-plate 73 thus formed can be laminated with the O-plate 72' in a roll-to-roll manner. The supporting substrate is removed during lamination when the supporting substrate is made from the same material as the aforesaid removable supporting substrate. Note that the C-plate 73 thus formed can be laminated with an A-plate (not shown) in a roll-to-roll manner when the optical axis of the A-plate is parallel to the longitudinal direction or the moving direction. In addition, when the compensator 7 solely includes the C-plate 73, i.e., without the O-plate 72' and the transparent substrate 71, the C-plate 73 can be formed directly on the surface of a glass layer of a liquid crystal cell by coating the solution thereon and subjecting subsequently the coated film to a cross-linking reaction.

Moreover, the compensator 7 can be prepared by rubbing the C-plate 73, coating a liquid crystal material on the rubbed C-plate 73, hardening the liquid crystal film on the rubbed C-plate 73 so as to form the liquid crystal layer 72 on the C-plate 73, and attaching the transparent substrate 71 to the liquid crystal layer 72 through an adhesive, such as a UV photosensitive adhesive.

Furthermore, the compensator 7 can also be prepared by applying a UV photosensitive adhesive to the C-plate 73, attaching the O-plate 72' together with the transparent substrate 71 to the C-plate 73 through the adhesive, and radiating the adhesive with UV ray so as to harden the adhesive. When the C-plate 73 is accompanied by a removable supporting substrate, the removable supporting substrate is subsequently removed upon formation of the compensator 7.

Formation of the O-plate 72' can be carried out by preparing a rubbed substrate that was rubbed along a predetermined direction, preparing a solution that contains the liquid crystal molecules and a photo-initiator, applying the solution to the rubbed substrate, heating the applied liquid crystal film to a liquid state so as to align the liquid crystal molecules of the applied liquid crystal film in the predetermined direction, radiating the applied liquid crystal film with UV ray so as to harden the film on the rubbed substrate, and transferring the liquid crystal film from the rubbed substrate to a non-rubbed substrate. The rubbed substrate can be made from plastics, such as PET or OPP, that can be rubbed, or cellulose acetate.

Rubbing of the C-plate 73 or the substrate used for the O-plate 72' can be carried out by using a rubbing machine operated at a roller speed ranging from 300 to 1200 rpm, a pile impression ranging from 0.1 mm to 0.5 mm, and a moving speed of the C-plate 73 or the substrate ranging from 3 to 20 m/min.

The compensator 7 can be laminated with the polarizer layer 81 or the analyzer layer 82 in a roll-to-roll manner so as to form a rolled ellipsoidal polarization plate, which is subsequently cut into a desired size corresponding to that of the liquid crystal cell 10.

EXAMPLES AND COMPARATIVE EXAMPLES

The following Examples and Comparative Examples illustrate the unexpectedly better results of this invention over the prior art.

Comparative Examples 1-3

PVA samples for Comparative Examples 1-3 were prepared by the following consecutive steps:
(1) preparing PVA pellets having a predetermined polymerization degree of 1700, 2600, and 3800 for Comparative Examples 1-3 and a saponification degree of 98 mol % for each of the Comparative Examples 1-3;
(2) adding the PVA pellets into a water body, and stirring the water body under an operation temperature ranging from 80 to 95° C. so as to dissolve the PVA pellets in the water body and so as to obtain a PVA solution; and
(3) applying the PVA solution to a glass substrate through spin coating techniques, and drying the applied PVA layer on the glass substrate so as to obtain a dried PVA film that includes the dried PVA layer and the glass substrate. Note that no cross-linking agent was added in the PVA solution for each of the Comparative Examples 1-3, and the dried PVA layer thus formed is non-cross-linked.

The dried PVA film obtained for each of the Comparative Examples 1-3 was measured for its retardation $R_{th}$ and the refractive indexes in different directions, i.e., $n_x$, $n_y$, and $n_z$ using an ellipsometer. The results are shown in Table 1, and indicate that the retardation $R_{th}$ of the dried PVA film for each of the Comparative Examples 1-3 is relatively small and is inadequate to provide the function of a C-plate compensator for the TN-LCD.

TABLE 1

|  | Example 1 | Comparative Example 1 | Comparative Example 2 | Comparative Example 3 |
|---|---|---|---|---|
| Polymerization degree | 2600 | 1700 | 2600 | 3800 |
| PVA layer thickness, μm | 25 | 25 | 25 | 25 |
| $n_x$ | 1.53054 | 1.53055 | 1.53047 | 1.53056 |
| $n_y$ | 1.53056 | 1.53056 | 1.53056 | 1.53056 |
| $n_z$ | 1.52433 | 1.52635 | 1.52595 | 1.52535 |
| Δn | 0.0062 | 0.0042 | 0.0046 | 0.0052 |
| $R_{th}$ | 155 | 105 | 115 | 130 |

Example 1

A PVA sample for Example 1 was prepared by the following consecutive steps:
(1) preparing PVA pellets having a predetermined polymerization degree of 2600 and a saponification degree of 98 mol %;
(2) adding the PVA pellets into a water body, and stirring the water body under an operation temperature of 80-95° C. so as to dissolve the pellets in the water body;
(3) adding methanol into the water body until a ratio of 1:5 (methanol:water) is reached so as to form a first solution (the PVA solid content is about 8-10%);
(4) blending a cross-linking agent of melamine formaldehyde (in an amount that is 25 wt % based on the weight of PVA used) with a catalyst of p-toluenesulfonic acid (in an amount that is 6.25 wt % based on the weight of PVA used) under an operation temperature of 40-70° C. for 15-60 minutes so as to form a second solution;
(5) adding the second solution into the first solution and stirring the mixture for 30-60 minutes so as to form a PVA solution; and
(6) applying the PVA solution to a rolled PET substrate through spin coating techniques; and
(7) drying the applied PVA layer at a temperature ranging from 110-130° C. so as to permit complete cross-linking of the PVA layer (having a layer thickness of about 25 μm) and so as to form a rolled PVA film that includes the PVA layer and the PET substrate.

The rolled PVA film obtained for Example 1 was cut into pieces for measuring its retardation $R_{th}$ and the refractive indexes $n_x$, $n_y$, and $n_z$ using an ellipsometer. The results are shown in Table 1, and indicate that the retardation $R_{th}$ of the rolled PVA film for Example 1 is 155 nm, which is sufficient to provide the function of a C-plate compensator for the TN-LCD.

Preparation of TN-LCD

An TN-LCD was prepared for each of Examples 2-11 and Comparative Examples 4-7 according to the following consecutive steps:
(1) Preparation of an O-Plate with a Substrate
 (a) preparing a first solution containing reactive rod-like liquid crystal molecules and a photo initiator;
 (b) applying the first solution to a cellulose acetate substrate that was rubbed along a film moving direction under a roller speed of 500 rpm, a pile impression of 0.3 mm, and a film moving speed of 10 m/min, the applied liquid crystal film on the cellulose acetate substrate having a thickness of 1 μm;
 (c) heating the applied liquid crystal film at a temperature of 75° C. for 30 seconds so as to transform the applied liquid crystal film into a liquid state;
 (d) radiating the liquefied liquid crystal film with UV ray, that has a wavelength of 365 nm and an energy of 200 mj/cm, under an exposure rate of 5-10 m/min so as to form a hardened liquid crystal film on the rolled cellulose acetate substrate;
 (e) preparing a rolled, non-rubbed cellulose acetate substrate coated with a transferring adhesive, and transferring the hardened liquid crystal film from the rubbed cellulose acetate substrate to the non-rubbed cellulose acetate substrate in a roll-to-roll manner in such a manner that the liquid crystal molecules with the maximum tilted angle θ are disposed adjacent to the non-rubbed cellulose acetate substrate so as to form a rolled O-plate, that includes the liquid crystal film, with the non-rubbed cellulose acetate substrate;
(2) Preparation of the TN-LCD
 (f) applying a photo sensitive adhesive to the dried PVA film obtained according to the processing steps of the Comparative Examples 1-3 for the Comparative Examples 4-7 or the processing steps of the Example 1 for the Examples 2-11;
 (g) attaching the O-plate to the dried PVA film through the photo sensitive adhesive in a roll-to-roll manner;
 (h) radiating the photo sensitive adhesive with UV ray;
 (i) removing the PET film or the glass substrate from the dried PVA film so as to obtain a rolled compensator that includes the cellulose acetate substrate, the O-plate, and the dried PVA layer;

(j) laminating the rolled compensator with a rolled polarizer layer in a roll-to-roll manner so as to obtain a rolled polarization plate;
(k) cutting the rolled polarization plate into pieces that have a size corresponding to that of a TN-type liquid crystal cell; and
(l) attaching two of the polarization plates to opposite first and second surfaces of the liquid crystal cell so as to form the TN-LCD (see FIG. 1).

The range of viewing angle of the TN-LCD thus formed was measured. FIGS. 4 to 13, which are isocontrast plots, are the measuring results corresponding to Examples 2 to 11, respectively.

Example 2

Figure 4:
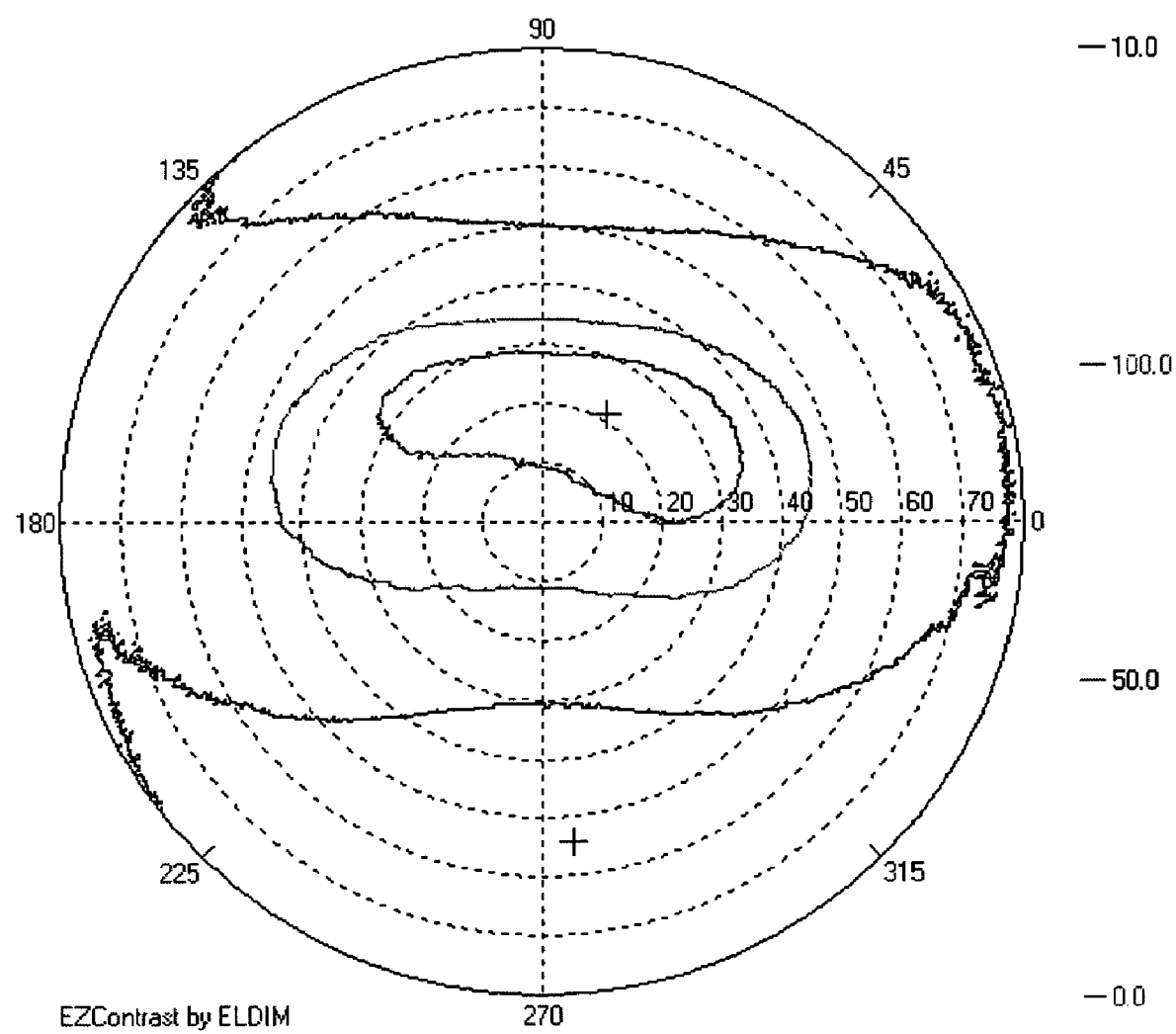
FIGS. 4 to 13 are isocontrast plots for Examples 2 to 11, respectively.

In this Example, the C-plate obtained from Example 1 was used for forming the TN-LCD. The measured viewing angle is shown in Table 2. FIG. 4 is the isocontrast plot of Example 2.

TABLE 2

|  | Example 2 | Example 3 | Comparative Example 4 | Comparative Example 5 | Comparative Example 6 |
|---|---|---|---|---|---|
| Polymerization degree | 2600 | 3800 | 500 | 1000 | 1700 |
| PVA layer thickness, μm | 25 | 25 | 25 | 25 | 25 |
| $n_x$ | 1.53054 | 1.53052 | 1.53062 | 1.53051 | 1.53048 |
| $n_y$ | 1.53056 | 1.53056 | 1.53056 | 1.53056 | 1.53056 |
| $n_z$ | 1.52433 | 1.52419 | 1.52795 | 1.52771 | 1.52584 |
| Δn | 0.0062 | 0.064 | 0.0026 | 0.0028 | 0.0047 |
| $R_{th}$ | 155 | 160 | 65 | 70 | 118 |
| Vertical viewing angle | 50, 32 | 50, 30 | 45, 35 | 45, 35 | 50, 35 |
| Horizontal viewing angle | 80, 80 | 80, 80 | 35, 35 | 35, 35 | 50, 50 |

Example 3

Figure 5:
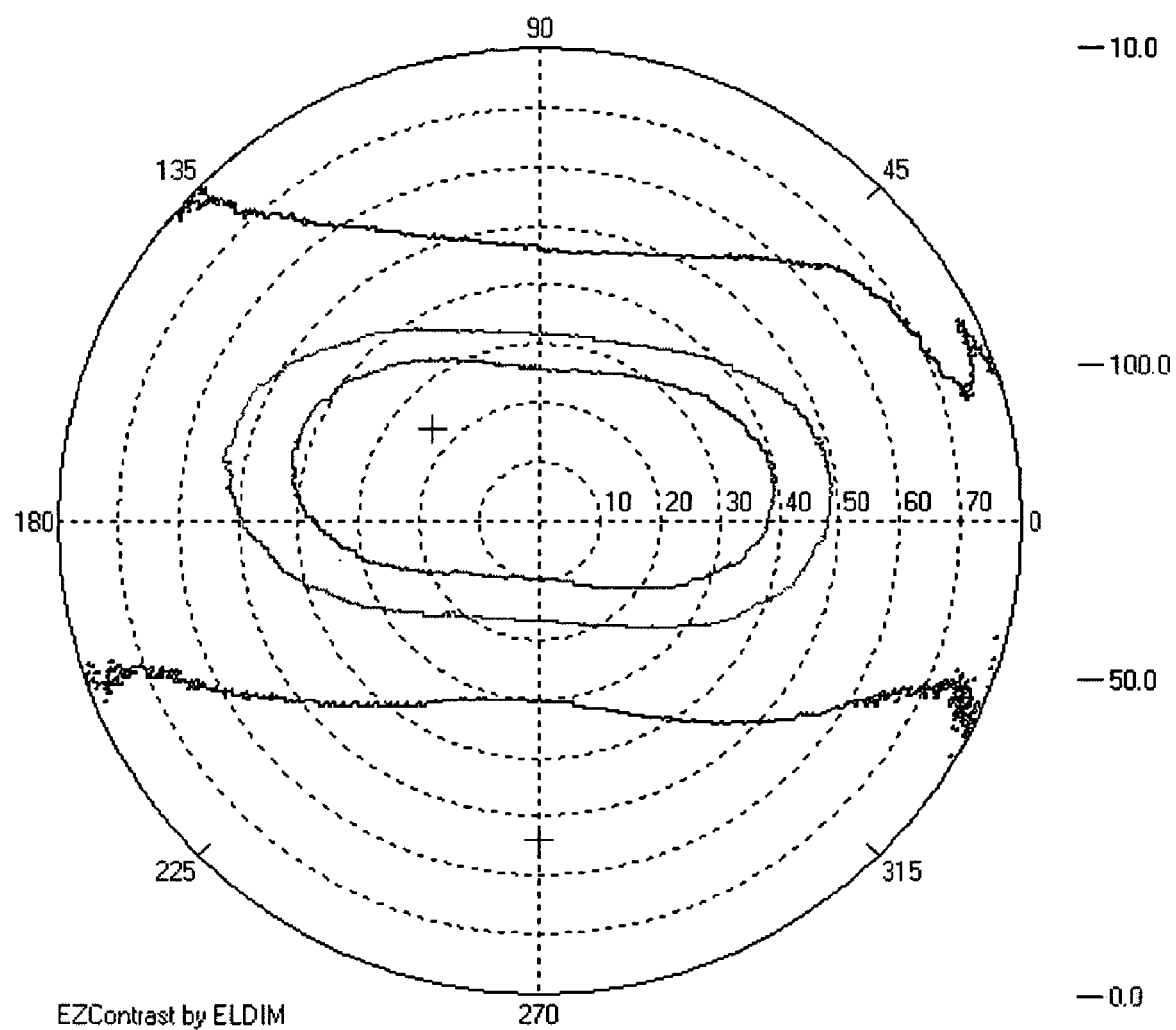

This Example differs from Example 2 in that the PVA pellets used for preparing the C-plate have a polymerization degree of 3800. The measured viewing angle is shown in Table 2. FIG. 5 is the isocontrast plot of Example 3.

Comparative Examples 4-6

The polymerization degrees of the PVA pellets used for preparing the dried PVA film (non-cross-linked) for Examples 4-6 are respectively 500, 1000, and 1700. The results are shown in Table 2.

Examples 4-6

Figure 6:
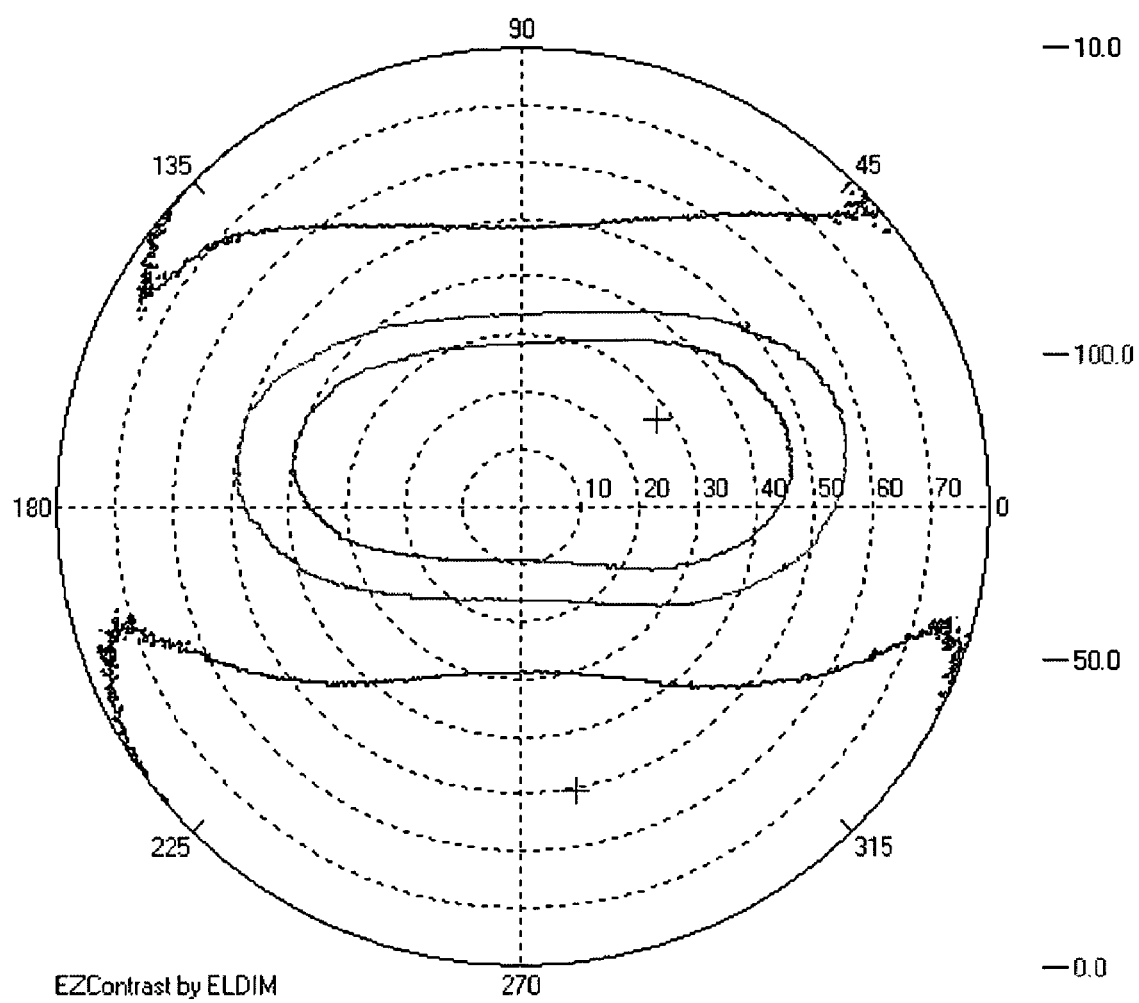
Figure 7:
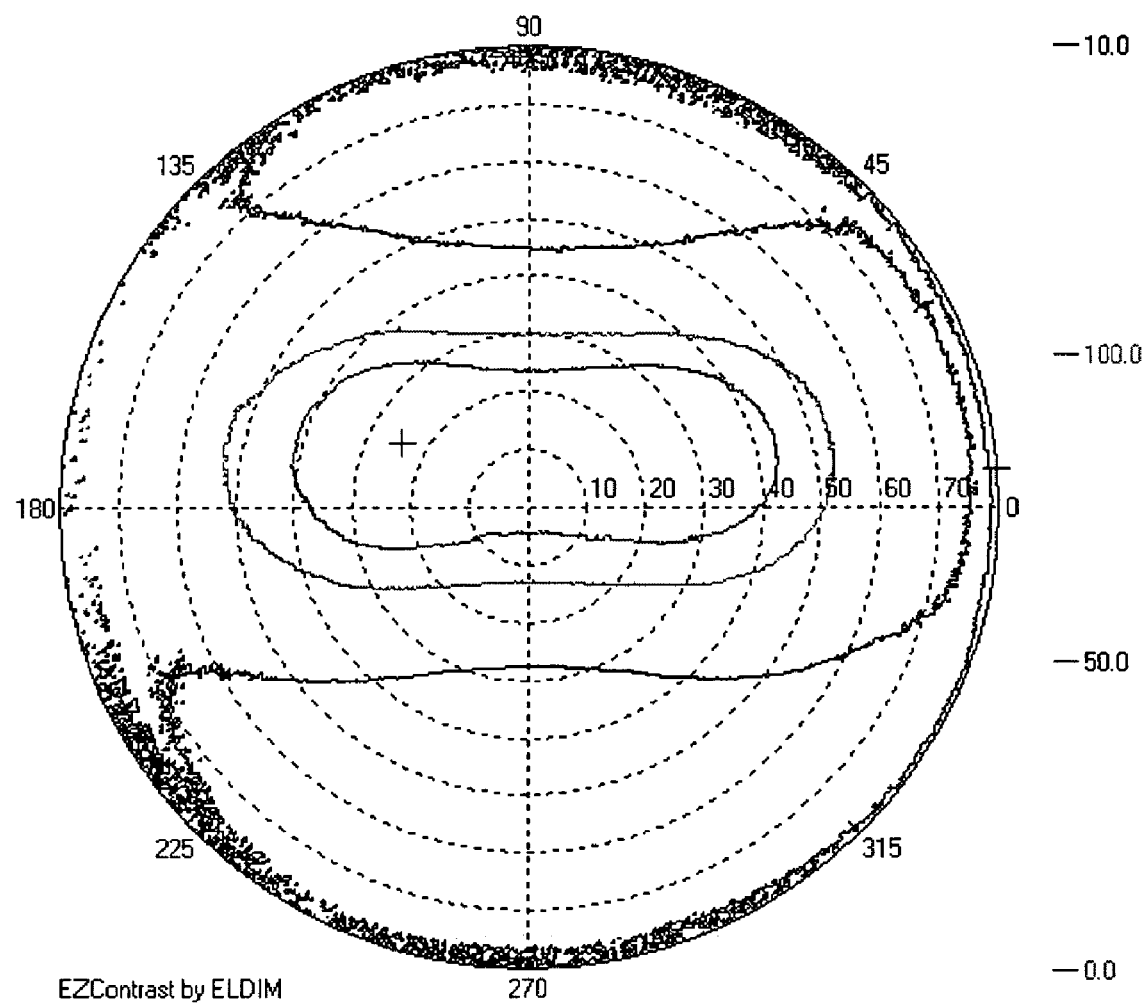
Figure 8:
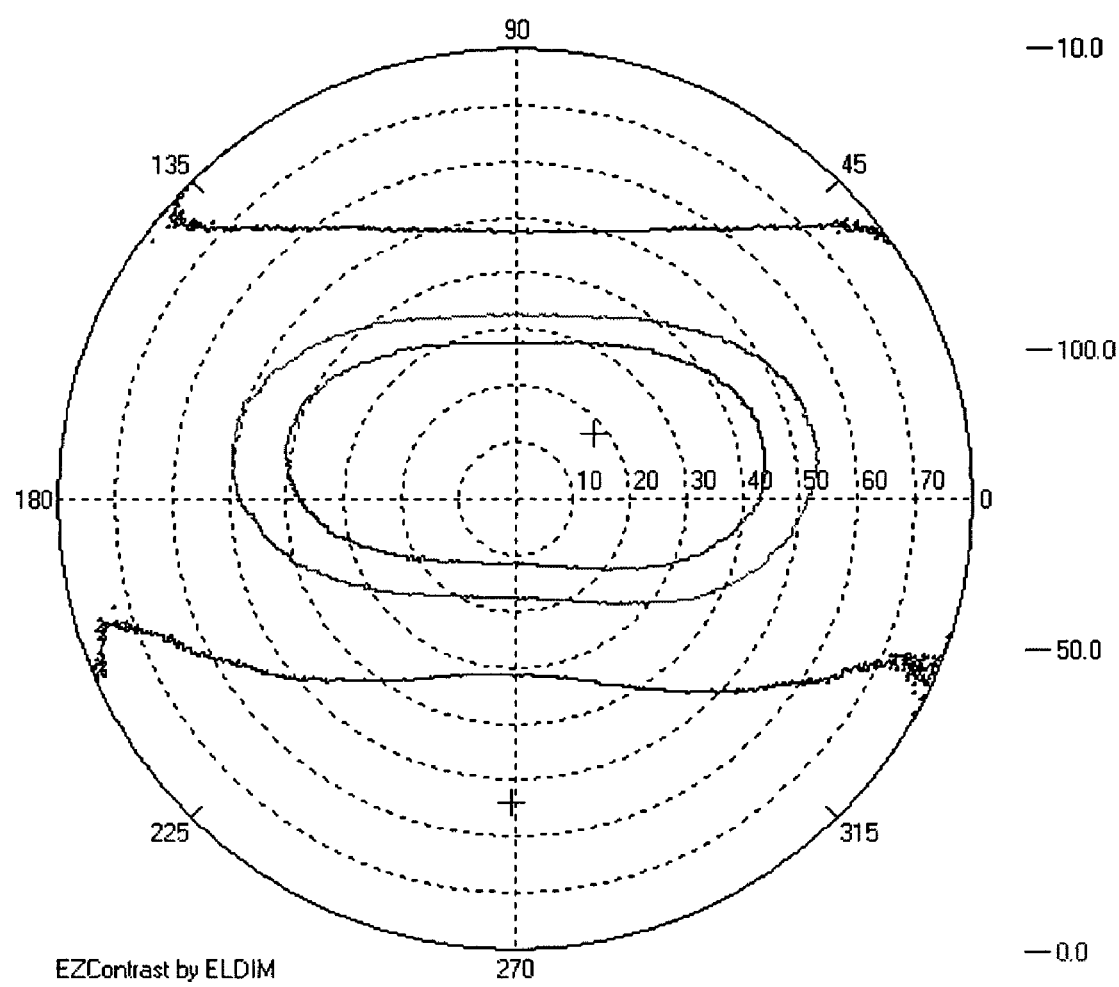

These Examples differ from Example 2 in that the amounts of the cross-linking agent (melamine formaldehyde) used for preparing the C-plate are 15 wt %, 20 wt %, and 30 wt % for Examples 4-6, respectively. The measured results are shown in Table 3. FIGS. 6-8 are the isocontrast plots of Examples 4-6, respectively.

TABLE 3

|  | Example 4 | Example 5 | Example 6 |
|---|---|---|---|
| Polymerization degree | 2600 | 2600 | 2600 |
| Cross-linking agent | 15 wt % | 20 wt % | 30 wt % |
| PVA layer thickness, μm | 25 | 25 | 25 |
| $n_x$ | 1.53054 | 1.53055 | 1.53045 |
| $n_y$ | 1.53056 | 1.53056 | 1.53056 |
| $n_z$ | 1.52433 | 1.52410 | 1.52375 |
| Δn | 0.0062 | 0.0065 | 0.0068 |
| $R_{th}$ | 155 | 163 | 170 |
| Vertical viewing angle | 50, 32 | 52, 35 | 50, 32 |
| Horizontal viewing angle | 80, 80 | 80, 80 | 80, 80 |

Examples 7 and 8

Figure 9:
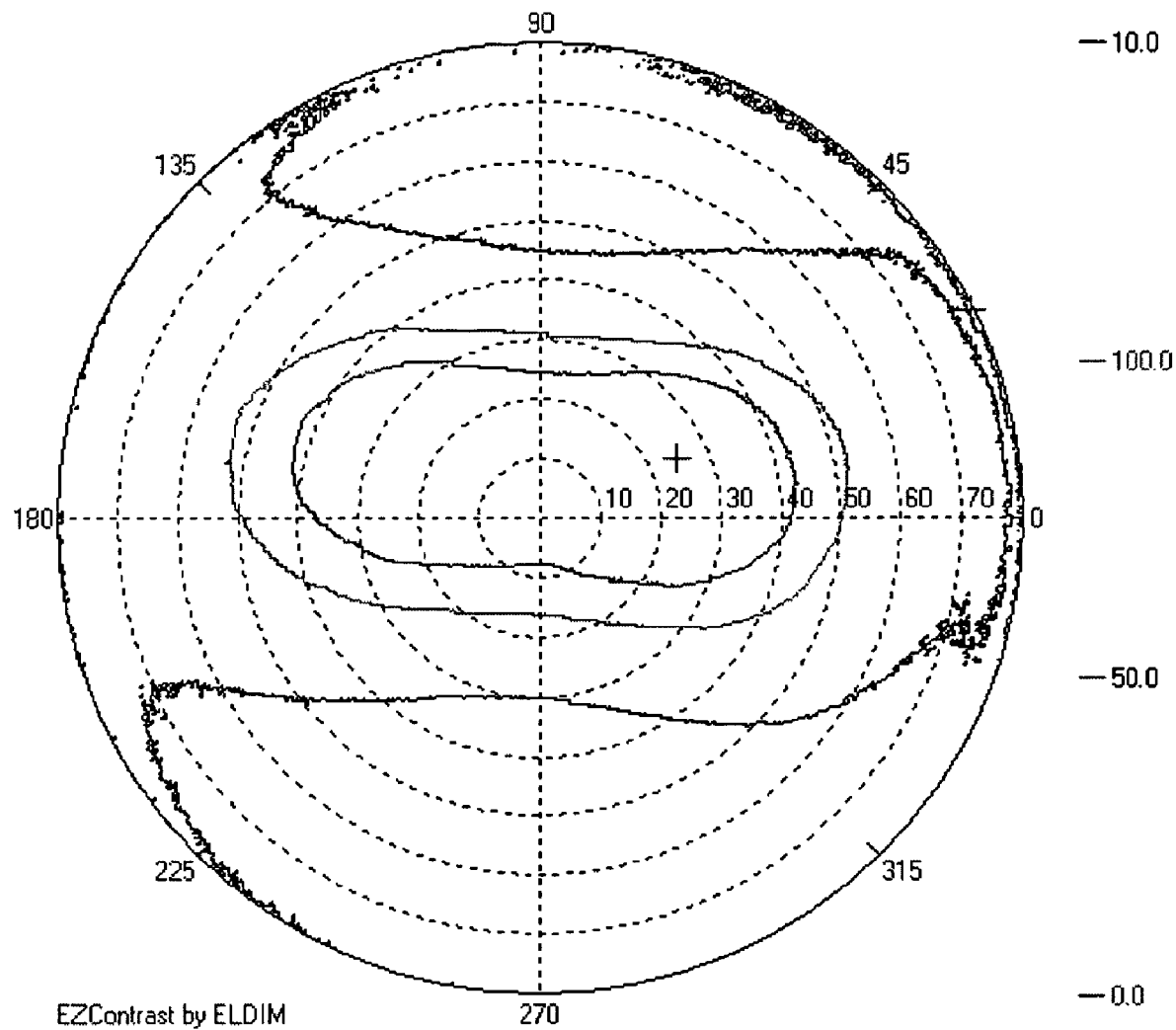
Figure 10:
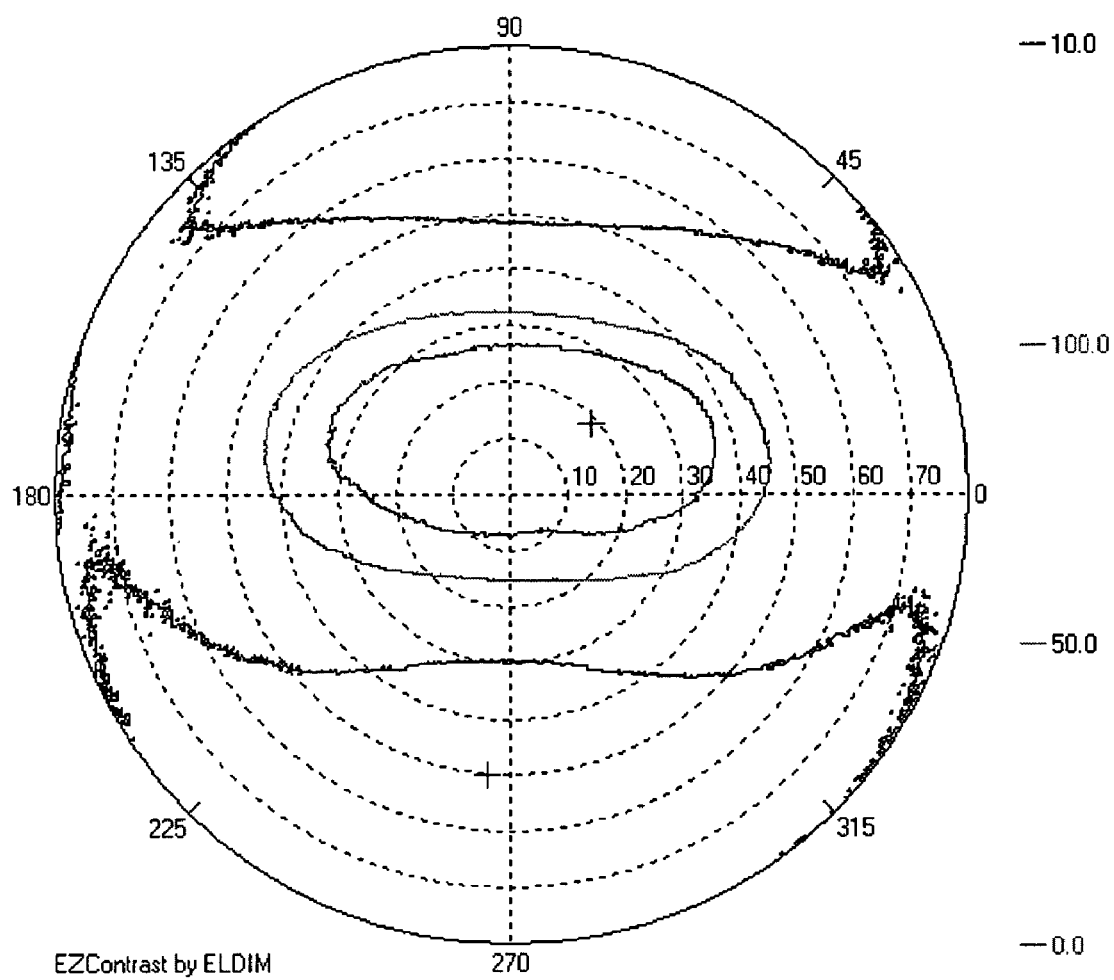

The two Examples differ from Example 2 in that an amount of 3 wt % of p-toluenesulfonic acid was used instead of methanol in step (3) of Example 1, and that the amount of p-toluenesulfonic acid added was 2 wt % and the amount of the cross-linking agent used was 5 wt % in step (4) of Example 1. Moreover, the dried PVA layers were 20 and 23 μm for Examples 7 and 8, respectively, and the polymerization degree of the PVA pellets used for Example 8 was 3800. The measured results are shown in Table 4. FIGS. 9 and 10 are the isocontrast plots for Examples 7 and 8, respectively.

TABLE 4

|  | Example 7 | Example 8 | Comparative Example 7 |
|---|---|---|---|
| Polymerization degree | 2600 | 3800 | 1700 |
| Cross-linking agent | 5 wt % | 5 wt % | 5 wt % |

TABLE 4-continued

|  | Example 7 | Example 8 | Comparative Example 7 |
|---|---|---|---|
| PVA layer thickness, μm | 20 | 23 | 20 |
| $n_x$ | 1.53059 | 1.53062 | 1.53045 |
| $n_y$ | 1.53056 | 1.53056 | 1.53056 |
| $n_z$ | 1.52255 | 1.52143 | 1.52584 |
| Δn | 0.0080 | 0.0092 | 0.0047 |
| $R_{th}$ | 160 | 184 | 94 |
| Vertical viewing angle | 50, 32 | 50, 30 | 48, 38 |
| Horizontal viewing angle | 80, 80 | 80, 80 | 40, 40 |

Comparative Example 7

This Comparative Example differs from Example 7 in that the polymerization degree of the PVA pellets used for preparing the dried PVA layer (non-cross-linked) was 1700. The measured results are shown in Table 4.

Examples 9-11

Figure 11:
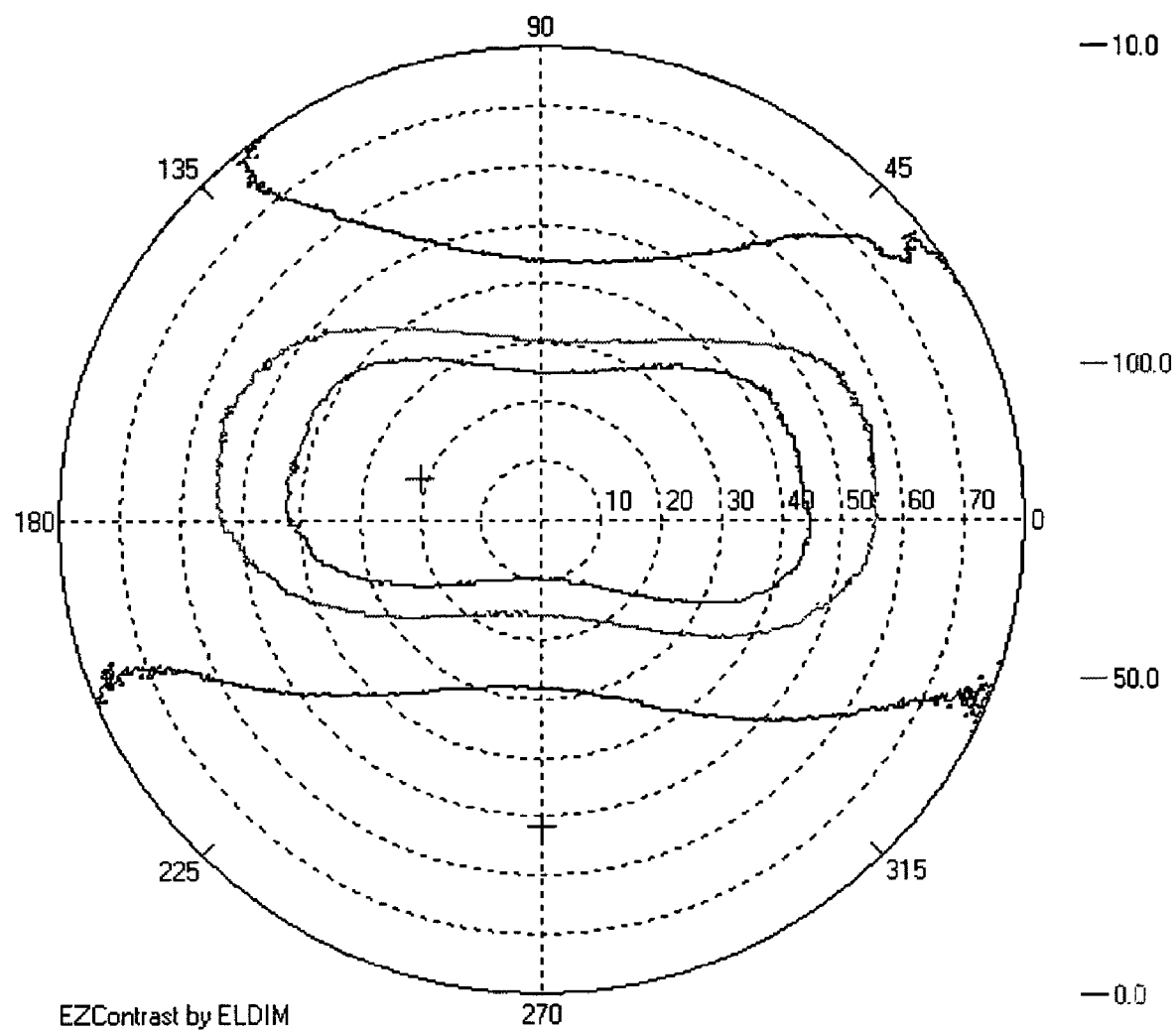
Figure 12:
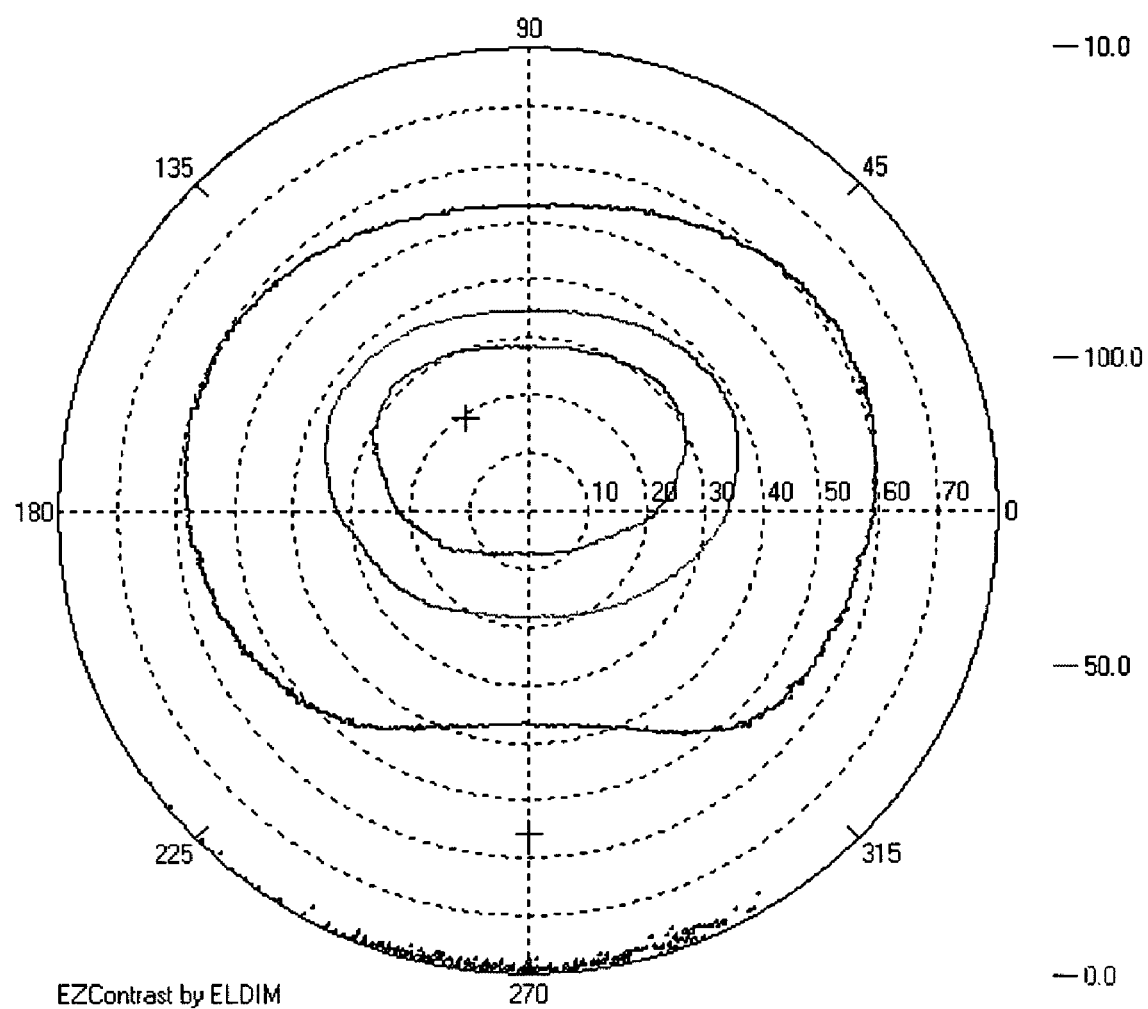
Figure 13:
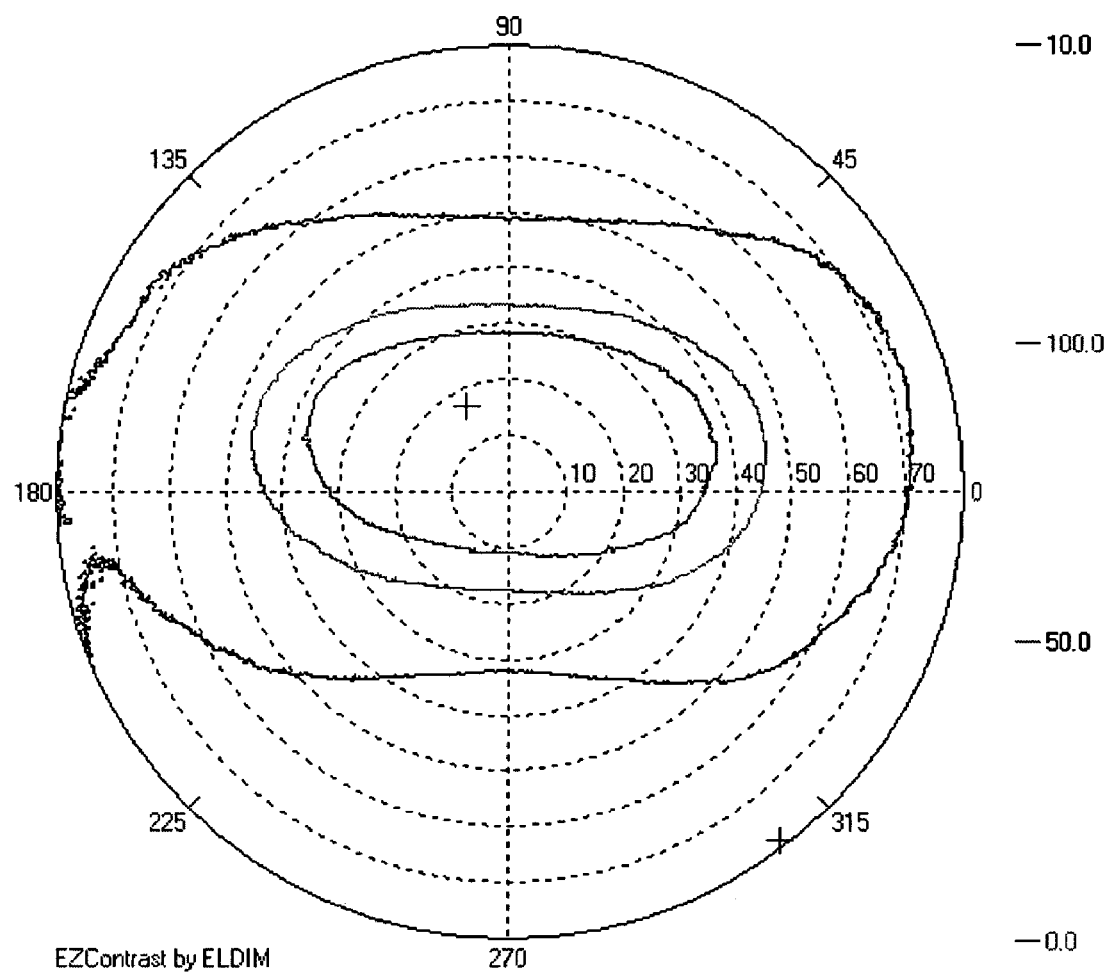

These Examples differ from Example 7 in that the cross-linking agents used are respectively glutaraldehyde, hexamethoxymethylmelamine, and glyoxal for Examples 9-11, respectively. The measured results are shown in Table 5. FIGS. 11-13 are the isocontrast plots for Examples 9-11, respectively.

TABLE 5

|  | Example 9 | Example 10 | Example 11 |
|---|---|---|---|
| Polymerization degree | 2600 | 2600 | 2600 |
| Cross-linking agent | glutaraldehyde | Hexamethoxymethylmelamine | glyoxal |
| PVA layer thickness, μm | 20 | 20 | 28 |
| $n_x$ | 1.53058 | 1.53045 | 1.53051 |
| $n_y$ | 1.53056 | 1.53056 | 1.53056 |
| $n_z$ | 1.52143 | 1.52303 | 1.52517 |
| Δn | 0.0091 | 0.0069 | 0.0054 |
| $R_{th}$ | 182 | 140 | 150 |
| Vertical viewing angle | 50, 30 | 53, 38 | 50, 35 |
| Horizontal viewing angle | 80, 80 | 60, 60 | 70, 70 |

The results of Examples 1-11 show that cross-linked PVA with a polymerization degree greater than 2000 is an excellent candidate as a material for manufacturing the C-plate, and permits lamination of the compensator and the polarizer layer in a roll-to-roll manner and assembling of the polarization plate and the liquid crystal cell to be conducted in the E-mode, which, in turn, facilitate mass production of liquid crystal displays, thereby significantly reducing the manufacturing costs.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

We claim:

1. An optical compensator for correcting a cell retardation in a liquid crystal cell, comprising:
    a C-plate adapted to be coupled to the liquid crystal cell, and made from a polymer;
    wherein said C-plate has a layer thickness ranging from 5 to 60 μm; and
    wherein said polymer is polyvinyl alcohol, has a polymerization degree greater than 2000 and less than 5000, and is cross-linked so that said C-plate has an optical axis substantially parallel to the direction of normally incident light, and so that said C-plate has a plate retardation, along the layer thickness of said C-plate, greater than 60 nm.

2. The optical compensator of claim 1, wherein the plate retardation of said C-plate is greater than 140 nm.

3. The optical compensator of claim 1, wherein said polymer has a polymerization degree greater than 2600 and less than 4000.

4. The optical compensator of claim 1, wherein said polymer has a saponification degree greater than 95 mol %.

5. The optical compensator of claim 1, wherein said polymer has a saponification degree greater than 98 mol %.

6. The optical compensator of claim 1, wherein said polymer is cross-linked through a cross-linking agent that is selected from the group consisting of melamine formaldehyde, hexamethylmelamine, hexamethoxymethylmelamine, $C_2$-$C_6$ dialdehydes, and a combination thereof.

7. The optical compensator of claim 6, wherein said cross-linking agent has a weight percentage, based on the weight of said polymer, ranging from 5 wt % to 40 wt %.

8. The optical compensator of claim 1, further comprising an O-plate laminated with said C-plate.

9. The optical compensator of claim 8, wherein said O-plate includes a liquid crystal layer with a splayed structure.

10. The optical compensator of claim 9, wherein said liquid crystal layer comprises reactive rod-like liquid crystal molecules.

11. The optical compensator of claim 9, further comprising a transparent substrate made from an isotropic material that exhibits a property such that the velocity of light is the same in all directions, said O-plate being sandwiched between said C-plate and said substrate.

12. The optical compensator of claim 11, wherein said isotropic material is selected from the group consisting of glass, cellulose esters, polycarbonate, polysulfone, polycycloolefin, polyether sulfone, polyacrylate, and polymethacrylate.

13. The optical compensator of claim 11, wherein said isotropic material is cellulose acetate.

14. The optical compensator of claim 11, wherein said liquid crystal layer has a first surface in contact with said substrate, and a second surface opposite to said first surface and in contact with said C-plate; and wherein the molecules of said liquid crystal layer have orientation directions that are tilted monotonously with respect to a plane parallel to said first and second surfaces at an angle that varies from a minimum value at said second surface of said liquid crystal layer to a maximum value at said first surface of said liquid crystal layer.

15. A liquid crystal display comprising:
    a polarizer layer;
    an analyzer layer;
    a liquid crystal cell disposed between said polarizer layer and said analyzer layer; and an optical compensator including a negative C-plate disposed between said liquid crystal cell and one of said polarizer layer and said analyzer layer, and made from a polymer that is polyvinyl alcohol having a polymerization degree greater than 2000 and less than 5000 and that is cross-linked.

16. The liquid crystal display of claim 15, wherein said negative C-plate has a layer thickness ranging from 5 to 60 μm.

17. The liquid crystal display of claim 16, wherein said negative C-plate has a plate retardation, along the layer thickness of said negative C-plate, greater than 60 nm.

18. The liquid crystal display of claim 16, wherein said negative C-plate has a plate retardation, along the layer thickness of said negative C-plate, greater than 140 nm.

19. The liquid crystal display of claim 15, wherein said polyvinyl alcohol has a polymerization degree greater than 2600 and less than 4000.

20. The liquid crystal display of claim 15, wherein said polyvinyl alcohol has a saponification degree greater than 95 mol %.

21. The liquid crystal display of claim 15, wherein said polyvinyl alcohol has a saponification degree greater than 98 mol %.

22. The liquid crystal display of claim 15, wherein said polyvinyl alcohol is cross-linked through a cross-linking agent that is selected from the group consisting of melamine formaldehyde, hexamethylmelamine, hexamethoxymethylmelamine, $C_2$-$C_6$ dialdehydes, and a combination thereof.

23. The liquid crystal display of claim 22, wherein said cross-linking agent has a weight percentage, based on the weight of said polymer, ranging from 5 wt % to 40 wt %.

24. The liquid crystal display of claim 15, wherein said optical compensator further includes a positive birefringent O-plate laminated with said negative C-plate.

25. The liquid crystal display of claim 24, wherein said positive birefringent O-plate includes a liquid crystal layer with a splayed structure.

26. The liquid crystal display of claim 25, wherein said liquid crystal layer comprises reactive rod-like liquid crystal molecules.

27. The liquid crystal display of claim 24, wherein said optical compensator further includes a transparent substrate made from an isotropic material that exhibits a property such that the velocity of light is the same in all directions, said positive birefringent O-plate being sandwiched between said negative C-plate and said substrate.

28. The liquid crystal display of claim 27, wherein said isotropic material is selected from the group consisting of glass, cellulose esters, polycarbonate, polysulfone, polycycloolefin, polyether sulfone, polyacrylate, and polymethacrylate.

29. The liquid crystal display of claim 27, wherein said liquid crystal layer has a first surface in contact with said substrate, and a second surface opposite to and parallel to said first surface and in contact with said negative C-plate; and wherein the molecules of said liquid crystal layer have orientation directions that are tilted monotonously with respect to a plane parallel to said first and second surfaces of said liquid crystal layer at an angle that varies from a minimum value at said second surface of said liquid crystal layer to a maximum value at said first surface of said liquid crystal layer.

30. The liquid crystal display of claim 29, wherein each of said polarizer layer and said analyzer layer has an absorbing axis, said absorbing axis of said polarizer layer being perpendicular to said absorbing axis of said analyzer layer, the projection of the orientation directions of the molecules of said liquid crystal layer on said plane being parallel to said absorbing axis of said one of said polarizer layer and said analyzer layer, said liquid crystal cell including opposite first and second orienting layers, each of which is disposed adjacent to a respective one of said polarizer layer and said analyzer layer, and each of which has a molecular orienting direction that is perpendicular to said absorbing axis of the respective one of said polarizer layer and said analyzer layer.

31. An optical compensating method for correcting a cell retardation of a liquid crystal cell, comprising:
preparing an optical compensator including a negative C-plate that is made from polyvinyl alcohol which has a polymerization degree greater than 2000 and less than 5000 and which is cross linked;
preparing a liquid crystal cell having a surface that is perpendicular to normally incident light; and
attaching the optical compensator to the surface of the liquid crystal cell in such a manner to enable correction of the cell retardation of the liquid crystal cell.

32. The method of claim 31, wherein the negative C-plate is formed with a layer thickness ranging from 5 to 60 μm.

33. The method of claim 32, wherein the negative C-plate is formed with a plate retardation, along the layer thickness of the negative C-plate, greater than 60 nm.

34. The method of claim 32, wherein the negative C-plate is formed with a plate retardation, along the layer thickness of the negative C-plate, greater than 140 nm.

* * * * *